H. L. PRATT.
SCROLL SAW FRAMES.
No. 177,659. Patented May 23, 1876.
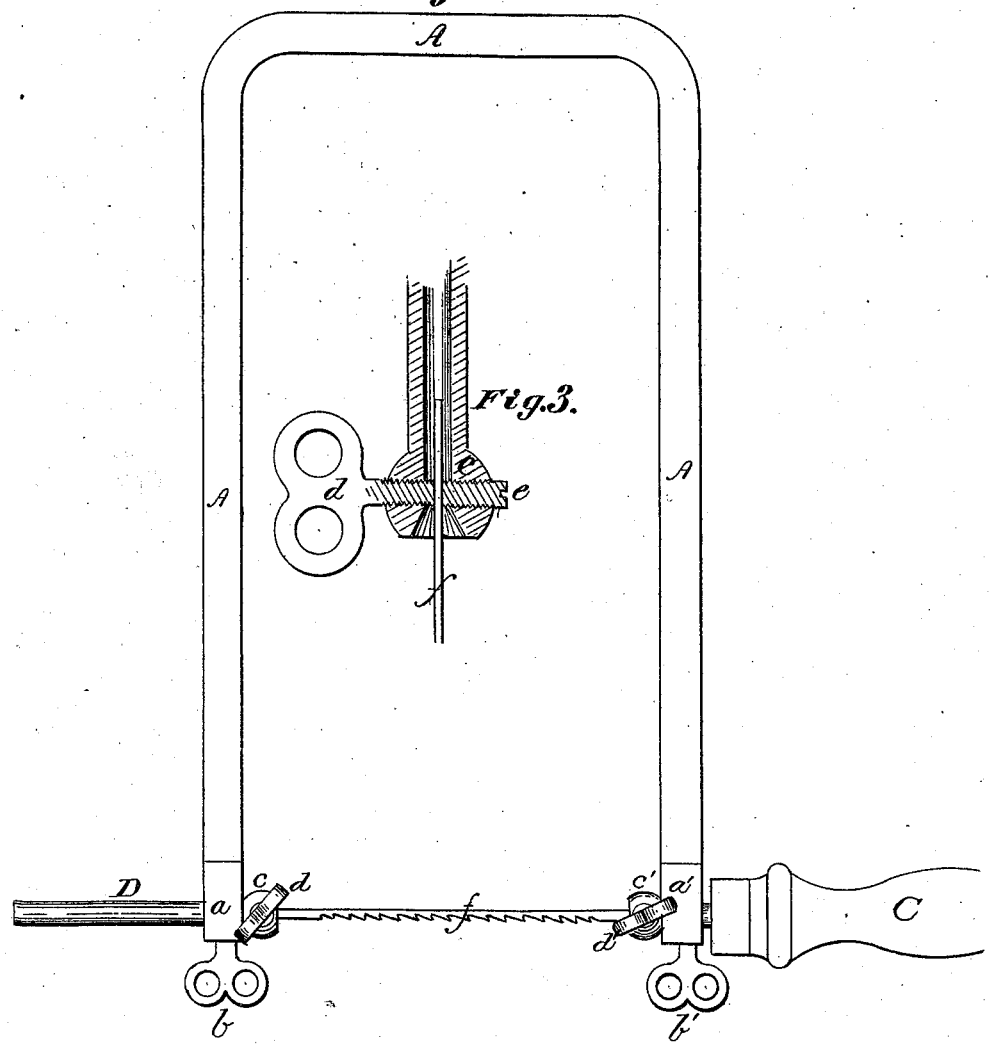
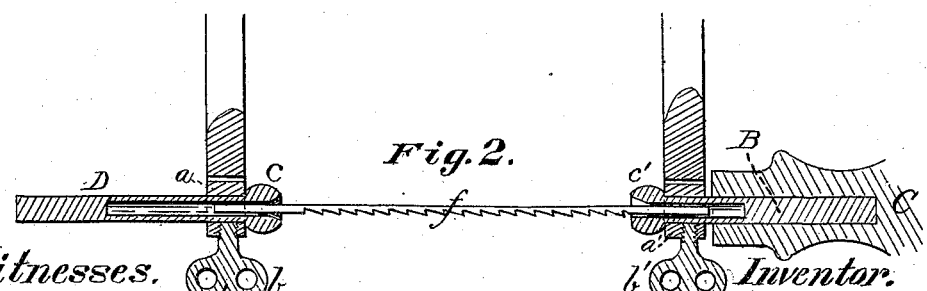
Witnesses. Inventor.
Henry L. Pratt.
per E. H. Johnson.
Atty.

UNITED STATES PATENT OFFICE.

HENRY L. PRATT, OF BROOKLYN, NEW YORK.

IMPROVEMENT IN SCROLL-SAW FRAMES.

Specification forming part of Letters Patent No. 177,659, dated May 23, 1876; application filed February 11, 1876.

*To all whom it may concern:*

Be it known that I, HENRY L. PRATT, of Brooklyn, in the county of Kings and State of New York, have invented certain Improvements in Scroll-Saw Frames, of which the following is a specification:

My invention relates to scroll-saw frames; and consists in a novel construction, combination, and arrangement of parts, which have for their object to improve said scroll-saw frames and facilitate the adjustment of the saw therein, as will be fully hereafter set forth.

Figure 1 is a side view of a saw-frame embodying my improvements. Fig. 2 is a sectional view of the same. Fig. 3 is an enlarged sectional detail view of a portion of the same.

A A is the frame proper, consisting of a strip of spring-steel of the shape shown. At each extremity is secured a block, $a a'$. Through a hole in the block $a'$ the rod B passes, and is secured permanently in the handle C, and through the block $a$ the rod D passes, and is capable of sliding and turning therein. $b b'$ are set-screws passing through the extremities of the blocks $a a'$, and which, when screwed down, bind on the rods B D. The rods B D are bored hollow from their inner ends, and are formed at these ends into spherical or other shaped heads $c c'$, and in these heads the opening of the bore of the rod flares or widens, as shown at Fig. 3. $d$ is a thumb-screw, which passes through one side of the head $c$, and $e$ is another set-screw, which passes through the other side, the axis of both screws coinciding. Each of these screws enters the bore of the rod slightly. The rod B is provided with a similar clamping device. $f$ is the saw-blade.

In inserting the saw into the frame, the thumb-screws $d d'$ are loosened, and one extremity of the saw (if the saw be longer than between the two heads when the same are in the position shown) is introduced into the conical cavity in either head, which forms the mouth of the bore of the tube. This cavity guides the saw to the screws $d e$, and by turning it slightly (if it be not in the right position) its end will enter between the screws $d$ and $e$, as shown at Fig. 3. The saw can then be advanced into the bore of the tube till its other extremity can be inserted into the other rod; which having been done, the thumb-screw $d'$ may be screwed down on the saw, and thus clamp it against the end of the other screw. The sides of the frame may then be sprung slightly toward each other, and the other thumb-screw $d$ screwed down, so as to clamp its end of the saw. On releasing the frame from the force compressing its sides it will act as a spring to keep the saw strained to the proper tension.

When the saw breaks, or is unusually short, it may be held in the frame by loosening the set-screw $b$, and moving in the rod D, so that the saw can enter its bore.

It is obvious that instead of employing a set-screw to hold the rods B D in the frame a clamp may be employed.

To set the saw at different angles as regards the plane of the frame, the set-screws $b b'$ are loosened, when the saw can be adjusted, as desired, with great facility.

I claim—

1. In combination with the frame A and set-screws $b b'$, the round rods B D, provided with internal bore, and the clamping-screws $d$ and $d'$, constructed and operating substantially in the manner described and specified.

2. The clamping device for clamping the saw-blade to the rods, consisting of the screw $d$ and the screw $e$, constructed and operating substantially in the manner described and specified.

HENRY L. PRATT.

Witnesses:
 E. P. STOUGHTON,
 J. L. VARICK.